(12) United States Patent
Verbrugge et al.

(10) Patent No.: US 6,416,231 B1
(45) Date of Patent: Jul. 9, 2002

(54) ROLLING BEARING ASSEMBLY

(75) Inventors: Francois Verbrugge, Cergy St Christophe; Michel Margerie, Vetheuil, both of (FR)

(73) Assignee: GKN Automotive AG, Lohmar (DE)

( * ) Notice: Subject to any disclaimer, the term of this patent is extended or adjusted under 35 U.S.C. 154(b) by 0 days.

(21) Appl. No.: 09/539,291

(22) Filed: Mar. 30, 2000

(30) Foreign Application Priority Data

Mar. 31, 1999 (FR) ............................................. 99 04037

(51) Int. Cl.$^7$ ................................................. F16C 19/26
(52) U.S. Cl. ......................................... 384/564; 384/903
(58) Field of Search ................................ 384/903, 564, 384/569, 572, 523

(56) References Cited

U.S. PATENT DOCUMENTS 2,860,869 A    11/1958   Utvitch
4,923,326 A    5/1990    Fietzke

FOREIGN PATENT DOCUMENTS

| DE | 24 43 366 A1 | 4/1976 |
| DE | 40 07 941 C1 | 9/1990 |
| DE | 43 27 036 A1 | 2/1995 |
| FR | 697.162 | 1/1931 |
| FR | 2 708 978 A1 | 2/1995 |
| FR | 2 738 881 A1 | 3/1997 |

*Primary Examiner*—Lenard A. Footland

(57) ABSTRACT

A rolling bearing assembly (9) comprising an inner ring (10), an outer roller (11) surrounding the inner ring, a needle race (12) placed between the inner ring and the outer roller to allow their relative pivoting about a common longitudinal axis (Z—Z), and an axial retention assembly (13) for retaining the outer roller and the needle race with respect to the inner ring. The retaining assembly comprises at least one split thrust washer (16) which extends radially from a radially outer peripheral region (26) of an axially outer surface of the inner ring towards a retaining groove (24) formed radially inside the outer roller. The split washer comprises an annular central zone (17) for axially retaining the needle race, and at least one series of peripheral supports (18, 19) which are spaced apart and which radially extend the annular central zone.

15 Claims, 4 Drawing Sheets

ROLLING BEARING ASSEMBLY

The invention relates generally to tripot-type constant-velocity joints for motor vehicle drivelines.

The present invention relates to a rolling bearing assembly of the type comprising an inner ring, an outer roller surrounding the inner ring, a needle race placed between the inner ring and the outer roller to allow their relative pivoting about a common longitudinal axis, and an axial retaining assembly for retaining the outer roller and the needle race with respect to the inner ring. The retaining assembly comprise at least one split thrust washer which extends radially only from a radially outer region of an axially outer surface of the inner ring towards a retaining groove formed radially inside the outer roller.

In general, assemblies of the aforementioned type used in applications, such as motor vehicle drivelines, each have two split washers, arranged axially one on each side of the inner ring and covering the needle race. The outer peripheral edge of each of these washers is engaged in a respective annular retaining groove formed in the outer roller.

It is necessary for these split washers to be deformed elastically in order to insert them in the grooves in the outer roller.

The thickness of these thrust washers is dictated, according to the material used, by considerations of limiting the risks of these washers going into "conical deformation" under the effect of an axial load.

In consequence, the ability of such a washer to deform may be measured by the coefficient $C=R/L$ where L is the radial width of the washer and R is its outside radius.

The higher the coefficient C, the greater the ability to deform the washer and the easier it is to fit.

The width L is slightly greater than the sum of the diameter of the needles, the distance over which the washer bears on the inner ring, and the distance over which the washer bears in the corresponding groove of the outer roller. In general, these two bearing distances have to be greater than 0.8 mm. Likewise, there is a minimum diameter imposed on the needles; their diameter having to be greater than the width of the slit in the split washer once the latter has been engaged in the corresponding groove in the outer roller.

Thus, in practice, it is not possible to vary L below a minimum value of about 3 mm.

In the case of small-sized drivelines, that is to say when R is small, the coefficient C may then be too low for it to be possible to assemble the driveline.

SUMMARY OF THE INVENTION

An object of the present invention is to solve this problem by providing a rolling bearing assembly of the aforementioned type which is easier to assemble and which can be made with relatively small dimensions.

To this end, the subject of the invention is a rolling bearing assembly of the aforementioned type, characterized in that the split washer comprises an annular central zone for axially retaining the needle race, and at least one series of peripheral supports which are spaced apart and which radially extend the annular central zone.

According to particular embodiments, the rolling bearing assembly may have one or more of the following features, taken in isolation or in any technically feasible combination.

The split washer may comprise a series of inner peripheral supports which are spaced apart and which extend the annular central zone towards the radially outer region of the axially outer surface of the inner ring. In addition, the split washer may comprise a series of outer peripheral supports which are spaced apart and which extend the annular central zone towards the retaining groove of the outer roller.

The rolling bearing assembly may include inner peripheral supports, which are angularly offset from outer peripheral supports, and/or inner and outer peripheral supports are practically radially aligned. In addition, the supports or each series of peripheral supports can be angularly distributed substantially uniformly.

The slit of the split washer may also be adjacent to at least one peripheral support, particularly an outer peripheral support. Also, a region of the split washer that is diametrically opposite the slit of the split washer may have at most one peripheral support.

The said washer may be formed of a strip of substantially constant width which is spaced from the longitudinal axis by a distance which varies along its periphery, so as to form inner and outer peripheral supports, alternately. The strip may also undulate about a pitch circle.

The split washer may also have a polygonal overall shape, the corners of which form outer peripheral supports, and the middle parts of the sides of which form inner peripheral supports.

The retaining groove is a groove that houses the needle race. The retaining assembly may comprise two split thrust washers arranged axially one on each side of the bearing assembly, these washers extending radially, covering the needle race, from radially outer regions of two axially outer surfaces of the inner ring as far as a common retaining groove formed radially inside the outer roller, and the common groove is the groove that houses the needle race. The groove that houses the needle race has a bottom which on the one hand forms a raceway for the needle race and on the other hand forms a thrust surface for each split washer, and the bottom has a substantially straight profile with a tolerance of within 0.5 mm.

Another subject of the invention is a constant velocity universal joint comprising a male element with a number of arms, a female element delimiting two runway tracks for each arm and, for each arm, a rolling bearing assembly mounted on the arm. This bearing assembly comprises an inner ring pivoting about the arm, an outer roller surrounding the inner ring and running along the two runway tracks, and a needle race placed between the inner ring and the outer roller to allow their relative pivoting about a common longitudinal axis, characterized in that at least one rolling bearing assembly is an assembly as described hereinabove.

BRIEF DESCRIPTION OF THE DRAWINGS

The invention will be better understood from reading the description which will follow, which is given merely by way of example and made with reference to the appended drawings, in which.

DETAILED DESCRIPTION OF THE PREFERRED EMBODIMENTS

Figure 1:
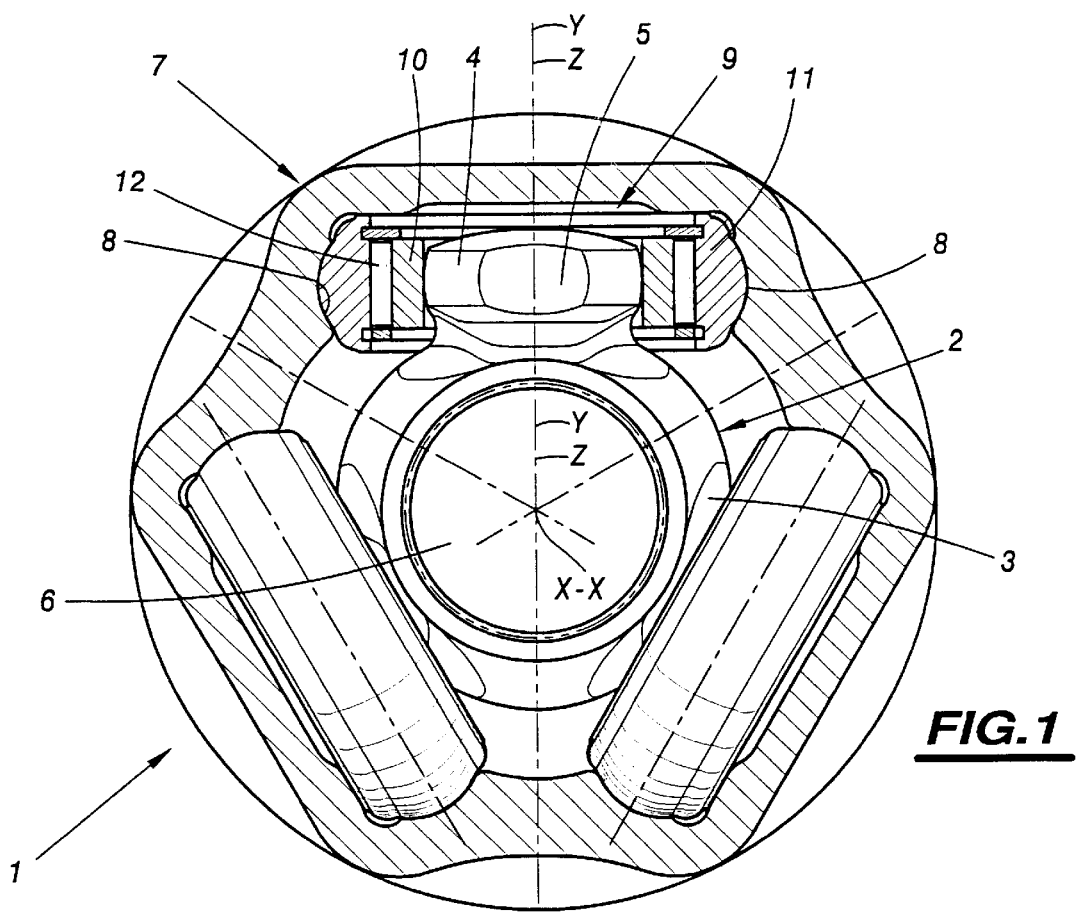
FIG. 1 is a half view in cross section of a universal joint according to one embodiment of the invention, in an aligned position.
Figure 3:
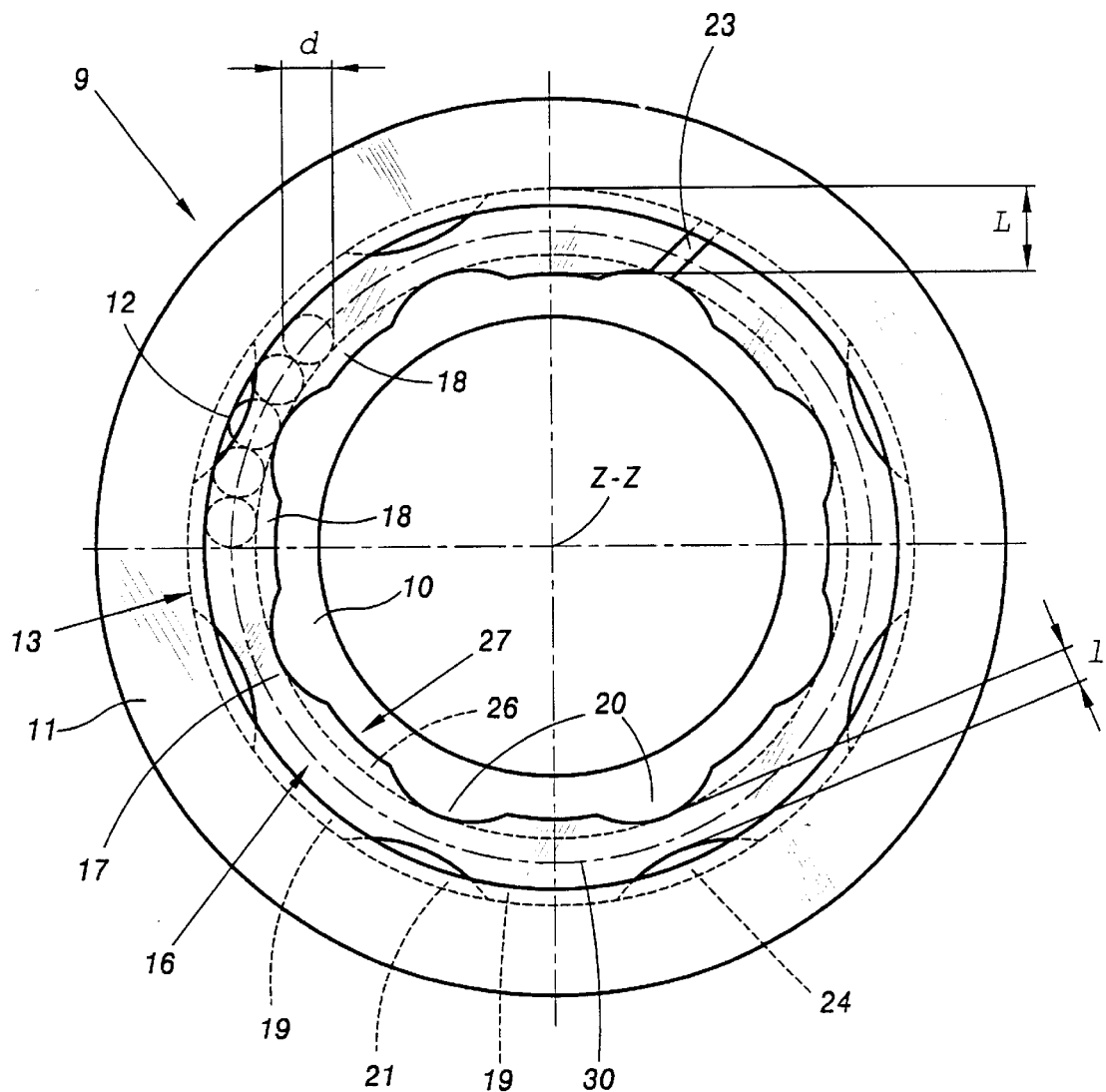
FIG. 3 is an enlarged plan view of the rolling bearing assembly of FIG. 2.

The constant-velocity joint 1 illustrated in FIGS. 1 and 3 generally comprise a male element 2 with a number of arms 4, a female element 7 delimiting two runway tracks 8 for each arm 4 and, for each arm 4, a rolling bearing assembly 9 mounted on the arm 4.

The male element or tripod for dolly 2 comprises a hub 3 of central axis X—X, from which three radial arms 4 spaced at an angle of 120° apart project. The end part of each arm 4 forms a spherical bearing surface 5 formed integrally with and centered on the axis Y—Y of the corresponding arm. This male element 2 is secured to a first rotating shaft 6.

The female element or bell housing 7, of which the central axis, when the joint is in the aligned position depicted, is coincident with the axis X—X. On each side of each arm 4, this bell housing 7 has two opposing runway tracks 8. This female element 7 is secured to a second rotating shaft, not depicted.

For each arm 4, there is a rolling bearing assembly 9 of axis Z—Z. This axis Z—Z is coincident with the axis Y—Y of the corresponding arm 4 in the aligned position depicted in FIG. 1.

As the three rolling bearing assemblies 9 are identical, only one of them will be described hereinbelow.

In this description, the terms radial, axial, longitudinal, transverse are to be understood as to being with respect to the assembly described and therefore with respect to its axis Z—Z.

Figure 2:
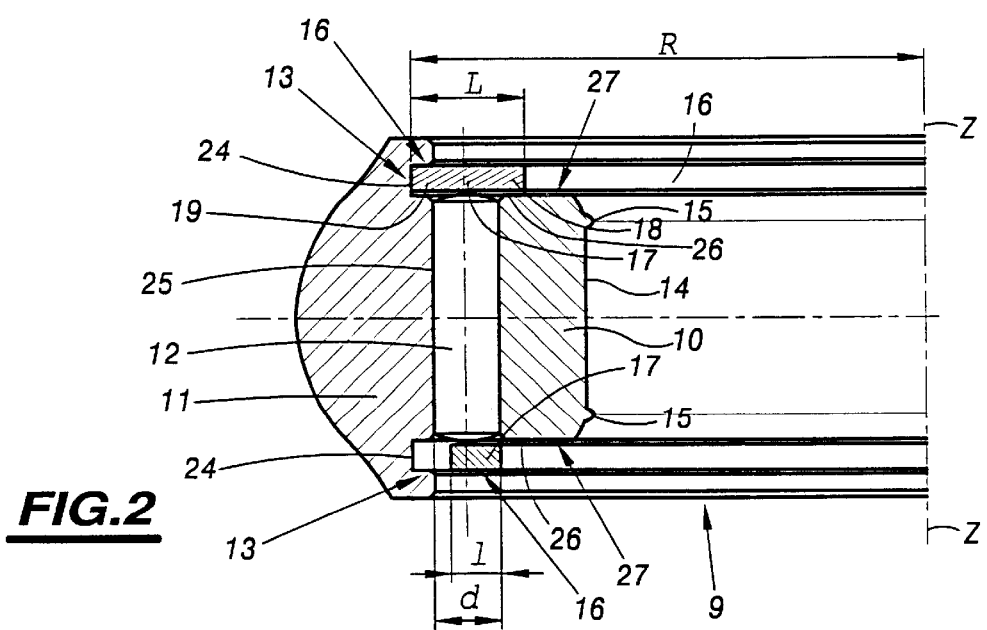
FIG. 2 is a partial, enlarged and sectioned view of a rolling bearing assembly of the joint of FIG. 1.

As illustrated more specifically in FIG. 2, the rolling bearing assembly 9 comprises: a cylindrical inner ring 10 of axis Z—Z, an outer roller 11 the overall shape of which is of revolution of axis Z—Z, surrounding the inner ring 10 from a distance, a needle race 11 arranged between the inner ring 10 and the outer roller 11, and an axial retention 13 assembly retaining the outer roller 11 and the needle race 12 with respect to the inner ring 10.

On its radially interior surface 14, the inner ring 10 has two annular bulges 15 of axis Z—Z, namely an upper bulge and a lower bulge respectively, these terms being understood as meaning with respect to the depiction in FIG. 2.

As illustrated by FIGS. 2 and 3, the axial retention assembly 13 comprises two split metal washers 16 which are identical and arranged axially one on each side of the inner ring 10 and of the needle race 12. It is to be noted that only some of the needles 12 have been depicted in FIG. 3.

Because the split washers 16 are identical, only the upper washer 16 in FIG. 2 will be described hereinbelow.

When viewed from above (FIG. 3), the washer 16 exhibits an annular central zone 17 for axially retaining 20 the needle race 12, this zone 17 having a width (1) slightly shorter than the diameter (d) of the needles 12; a series of inner peripheral supports 18; and a set of outer peripheral supports 19.

The washer 16 has been formed from an annulus of constant radial width Li in which series of inner recesses 20 and outer recesses 21 in the shapes of arcs of circles have been formed, on the inner edge and on the outer edge respectively, to delimit the inner peripheral supports 18 and the outer peripheral supports 19.

The inner recesses 20 are spaced at uniform distances from each other. Thus, the inner peripheral supports 18 are spaced at uniform angular intervals apart.

This is also true of the outer recesses 21, except in the region of the slit 23 in the washer 16, where no recess 21 has been formed.

The recesses 20 and 21 have been angularly distributed so that they align. That is to say so that each inner recess 20 is radially aligned with an outer recess 21, except in the region of the slit 23 where there is only an inner recess 20.

It will be noted that this slit 23 is at an angle to the radial direction.

The radial width of the washer 16 therefore increases out to the value (L) at the inner peripheral supports 18 and outer peripheral supports 19 and decreases down to the value (l) between the inner Peripheral supports 18 and outer peripheral supports 19. The value (l) is therefore the minimum radial width of the 15 washer 16.

The outer peripheral supports 19 are arranged in an annular upper groove 24 formed in the radially inner surface 25 of the outer roller 11.

This upper groove 24 is formed near the upper end of the outer roller 11.

The inner peripheral supports 18 bear only against a radially outer region 26 of the upper edge face 27 of the inner ring 10.

The central zone 17 of the upper washer 16 covers practically the entire needle race 12.

Thus the two washers 16, namely the upper and the lower washer, hold the inner ring 10 and the needle race 12 between them. As these washers 16 are engaged in the upper and lower grooves 24 of the outer roller f11, they axially retain the outer roller 11 and the needle race 12 with respect to the inner ring 10.

It is to be noted that if there is any contact between the needles 12 and each washer 16 this contact is in the region of the central zone 17 of this washer, more particularly at a pitch circle (shown in chain line) 30 of this central zone 17.

The rolling bearing assembly 9 therefore allows the joint 1 to operate in the conventional way, the inner ring 10 pivoting and sliding with respect to the spherical bearing surface 5 of the corresponding arm 4, the roller 11 pivoting about the axis Z—Z with respect to the inner ring 10 by virtue of the needle race 12, and the outer roller 11 rolling along one or other of the corresponding tracks 8.

It will be noted that the bulges 15 act as stops which limit the relative sliding of the inner ring 10 with respect to the spherical bearing surface 5 of the corresponding arm 4.

Furthermore, the deformability of the washers 16 is relatively great because, between their inner peripheral supports 18 and outer peripheral supports 19, these washers have a coefficient C which is lower than it is at the inner peripheral supports 18 and outer peripheral supports 19. This deformability is also great because, for each washer 16, there is no peripheral support in the region of the washer 16 diametrically opposite the slit 23.

Thus, for an inner ring 10, outer roller Hand needles 12 of the same size, the deformability of the two washers 16 is greater than would be the case in conventional washers with a constant radial width.

In consequence, the rolling bearing assemblies 9 are relatively easy to assemble and can be made with relatively small dimensions without thereby becoming impossible to assemble.

According to some alternative forms which have not been depicted, the inner peripheral supports 18 and outer peripheral supports 19 are distributed around the periphery of the washers 16, not with uniform spacings but in such a way that each washer 16 tends to retain a practically circular shape as it deforms.

Figure 5:
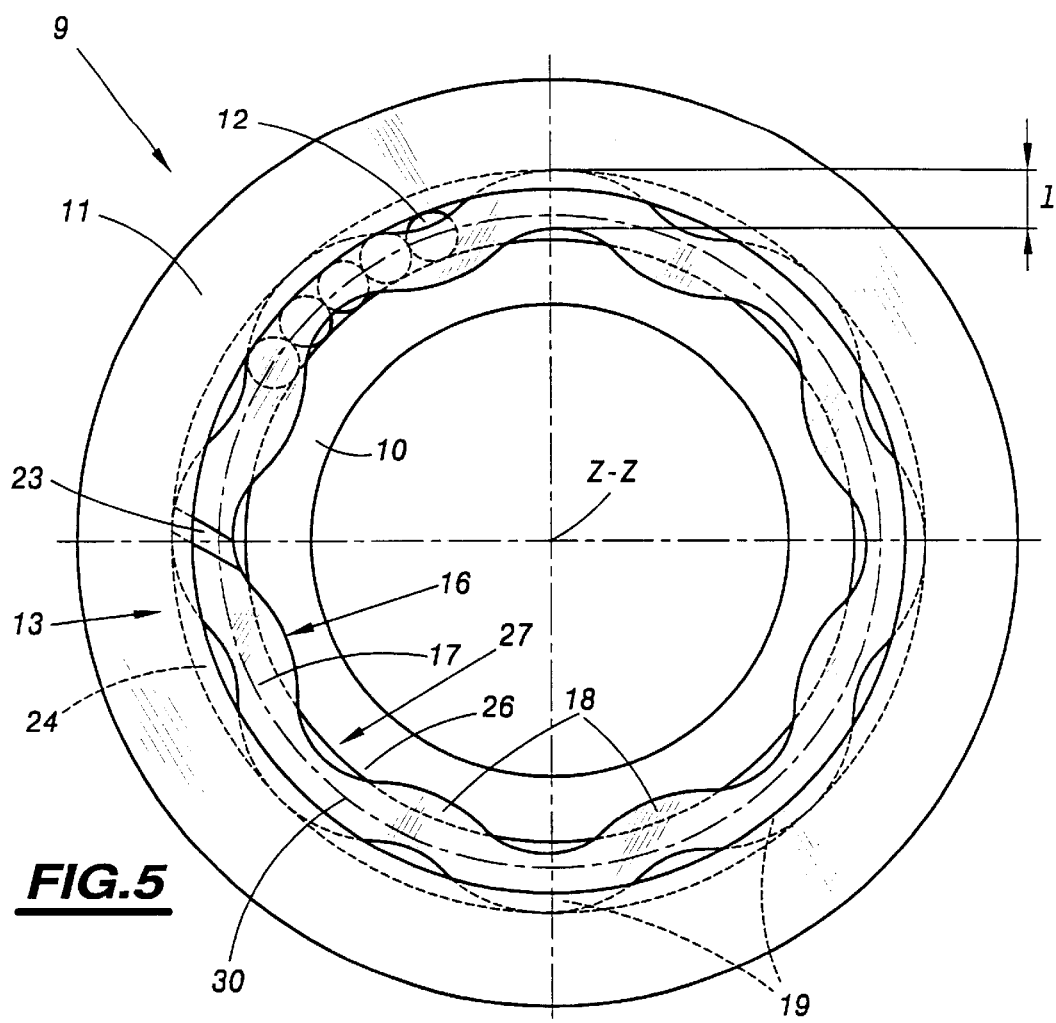
FIGS. 4 and 5 are views respectively similar to FIGS. 2 and 3, illustrating a first alternative form.
Figure 4:
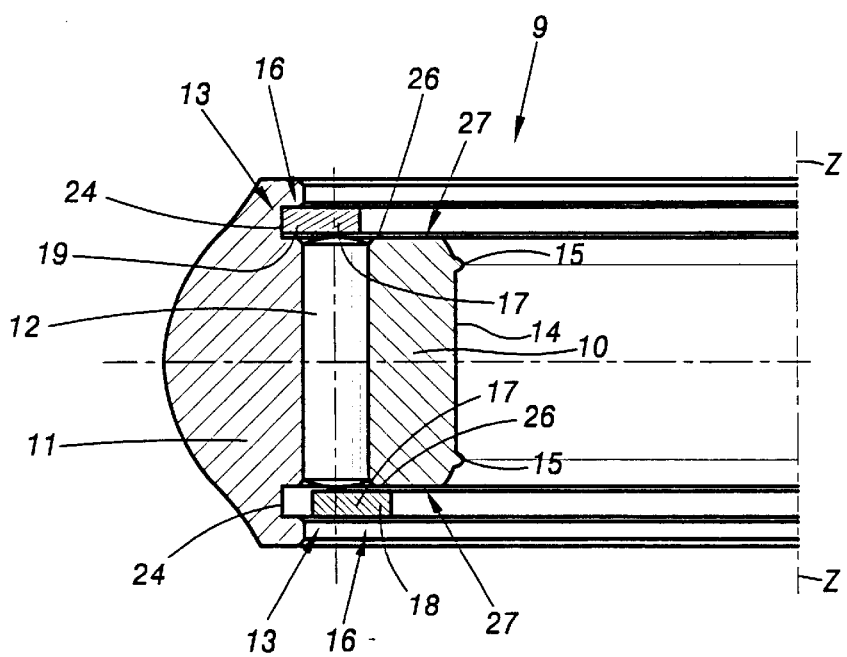

FIGS. 4 and 5 illustrate an alternative form in which the washers 16 are each formed of a strip of constant width (l) which undulates transversely about the pitch circle 30.

Thus, for each washer 16, the inner peripheral supports 18 are angularly offset from the outer peripheral supports 19.

Unlike the scenarios of FIGS. 1 to 3, the outer peripheral supports 19 are distributed at uniform angular spacings right around the outer peripheral edge of each washer 16. The slits 23 are each formed at an outer peripheral support 19.

In this alternative form, each washer 16 bears successively on the inside of the corresponding groove 24 of the outer roller 11 then on the outer peripheral region 26 of the corresponding edge face 27 of the inner ring 10.

Here again, the deformability of the washers is greater than that of a washer of constant radial width L.

Figure 6:
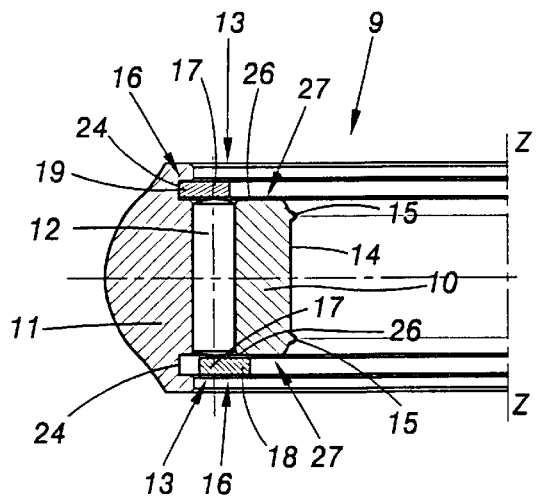
FIGS. 6 and 7 are views respectively similar to FIGS. 2 and 3 and illustrating a second alternative form.
Figure 7:
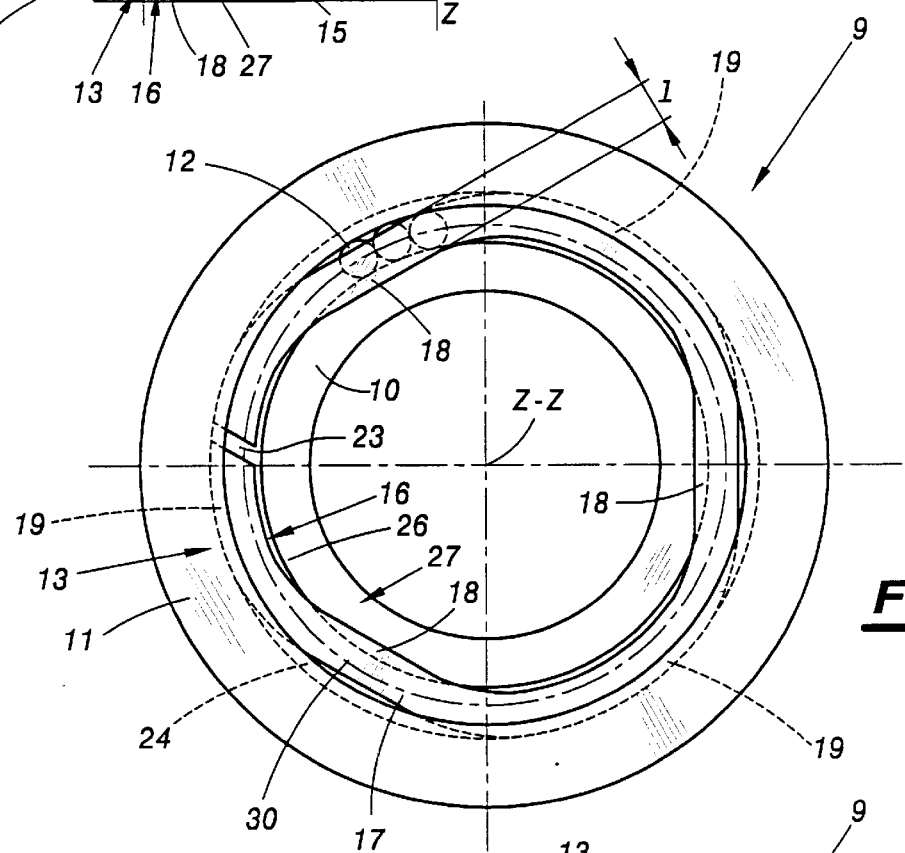

FIGS. 6 and 7 illustrate another alternative form in which the washers 16 are formed of a strip of constant width (l) with the overall shape, when viewed from above, of a triangle with rounded corners.

Each corner corresponds to an outer peripheral support 19 and each approximately straight side forms an inner peripheral support 18 at its middle.

Each slit 23 is formed at an outer peripheral support 19.

Figure 8:
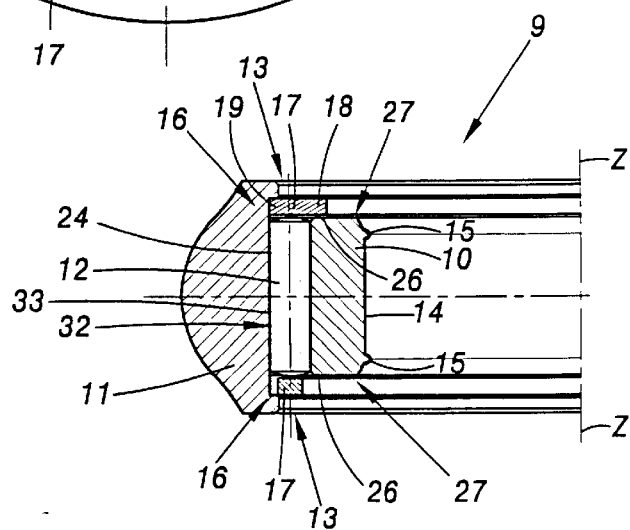
FIG. 8 is a view similar to FIG. 2 illustrating another embodiment.

FIG. 8 illustrates another embodiment which can be distinguished from that of FIGS. 1 to 3 in that the two grooves 24 of each outer roller 11 are replaced by a single groove 24 of greater axial length (along the axis Z—Z).

Thus, this groove 24 of approximately rectangular cross section acts, on the one hand, as a retaining groove for the two washers 16 and, on the other hand, as a groove for housing the needle race 12.

The bottom 32 of this groove has been surface-ground to give it a straight profile to a tolerance of within 0.5 mm.

A central region 33 of the bottom 32 therefore forms a raceway for the needle race 12, while end regions of this bottom 32 form thrust surfaces for the washers 16.

In this embodiment, the washers 16 therefore extend radially beyond the needle race 12, in a limited way that corresponds, at most, to the tolerance on the bottom 32 of the groove 24. Thus, the radial width of the washers 16 is decreased, by comparison with the embodiment of FIGS. 1 to 3, practically by the depth of the grooves 24 in this embodiment.

In consequence, the deformability of the washers 16 is further increased, which means that even smaller rolling bearing assemblies 9 can be produced.

It must also be noted that the embodiment of FIG. 8 also makes it possible, for each washer 16, to reduce the radial width of the part overhanging between the outer roller 11 and the inner ring 10.

Thus, the risk of the washers 16 experiencing conical deformation under axial load is also limited.

From the foregoing, it can be seen that there has been brought to the art a new and improved rolling bearing assembly. While the invention has been described in connection with one or more embodiments, it should be understood that the invention is not limited to those embodiments. On the contrary, the invention covers all alternatives, modifications and equivalents as may be included within the spirit and scope of the appended claims.

What is claimed is:

1. A rolling bearing assembly (9) comprising an inner ring (10), an outer roller (11) surrounding the inner ring (10), a needle race (12)) between the inner ring and the outer roller to allow their relative pivoting about a common longitudinal axis (Z—Z), and an axial retention assembly (13) for axially retaining the outer roller and the needle race with respect to the inner ring, said axial retention assembly comprising at least one split thrust washer (16) which extends radially outward only from a radial outer region (26) of an axial outer surface (27) of the inner ring (10) towards a retaining groove (24) formed radially inside the outer roller (11), wherein the split washer (16) comprises an annular central zone (17) for axially retaining the needle race (12), and at least one series of peripheral supports (18, 19) which are spaced apart and which radially extend the annular central zone (17) and wherein the split washer (16) comprises a series of outer peripheral supports (19) which are spaced apart and which extend the annular central zone (17) towards the retaining groove (24) of the outer roller (11).

2. A constant-velocity universal joint (1) comprising a male element (2) with a number of arms (4), a female element (7) delimiting two runway tracks (8) for each arm (4) and, for each arm, a rolling bearing assembly (9) mounted on the arm, the bearing assembly comprising an inner ring (10) pivoting about the arm, an outer roller (11) surrounding the inner ring and running along the two runway tracks (8), and a needle race (12) placed between the inner ring (10) and the outer roller (11) to allow their relative pivoting about a common longitudinal axis (Z—Z), wherein at least one rolling bearing assembly (9) is an assembly comprising:

an inner ring (10), an outer roller (11) surrounding the inner ring (10), a needle race (12) between the inner ring and the outer roller to allow their relative pivoting about a common longitudinal axis (Z—Z), and an axial retention assembly (13) for axially retaining the outer roller and the needle race with respect to the inner ring, said axial retention assembly comprising at least one split thrust washer (16) which extends radially outward only from a radial outer region (26) of an axial outer surface (27) of the inner ring (10) towards a retaining groove (24) formed radially inside the outer roller (11), wherein the split washer (16) comprises an annular central zone (17) for axially retaining the needle race (12), and at least one series of peripheral supports (18, 19) which are spaced apart and which radially extend the annular central zone (17).

3. A rolling bearing assembly (9) comprising an inner ring (10), an outer roller (11) surrounding the inner ring (10), a needle race (12) between the inner ring and the outer roller to allow their relative pivoting about a common longitudinal axis (Z—Z), and an axial retention assembly (13) for axially retaining the outer roller and the needle race with respect to the inner ring, said axial retention assembly comprising at least one split thrust washer (16) which extends radially outward only from a radial outer region (26) of an axial outer surface (27) of the inner ring (10) towards a retaining groove (24) formed radially inside the outer roller (11), characterized in that the spit washer (16) comprises an annular central zone (17) for axially retaining the needle race (12), and at least one series of peripheral supports (18, 19) which are spaced apart and which radially extend the annular central zone (17).

4. The assembly according to claim 3, wherein the split washer (16) comprises a series of inner peripheral supports (18) which are spaced apart and which extend the annular central zone (17) radially inward towards the radial outer region (26) of the axial outer surface (27) of the inner ring (10).

5. The assembly according to claim wherein the split washer (16) further comprises a series of outer peripheral supports (19) which are spaced apart and which extend the annular central zone (17) towards the retaining groove (24) of the outer roller (11), and wherein the inner (18) and outer (19) peripheral supports are practically radially aligned.

6. The assembly according to claim 4, wherein the split washer (16) further comprises a series of outer peripheral supports (19) which are spaced apart and which extend the annular central zone (17) towards the retaining groove (24) of the outer roller (11), and wherein the inner peripheral supports (18) are angularly offset from outer peripheral supports (19).

7. The assembly according to claim 1, wherein a slit (23) of the split washer (16) is adjacent to at least one peripheral support.

8. The assembly according to claim 3, wherein a region of the split washer (16) that is diametrically opposite a slit (23) of the split washer has at most one peripheral support (18, 19).

9. The assembly according to claim 3, wherein the split washer (16) is formed of a strip of substantially constant width which is spaced from the longitudinal axis (Z—Z) by a distance which varies along its periphery, so as to form inner (18) and outer (19) peripheral supports, alternately.

10. The assembly according to claim 9, wherein the strip undulates about a pitch circle.

11. The assembly according to claim 9 wherein the split washer has a polygonal overall shape, the corners of which form outer peripheral supports (19), and the middle parts of the sides of which form inner peripheral supports (18).

12. The assembly according to claim 3, wherein the retaining groove (24) is a groove that houses the needle race (12).

13. The assembly according to claim 12, wherein the retention assembly (13) comprises two split thrust washers (16) arranged axially one on each side of the bearing assembly (9), these washers extending radially outward, covering the needle race (12), from radial outer regions (26) of two axial outer surfaces (27) of the inner ring (10) as far as a common retaining groove (24) formed radially inside the outer roller (11), and wherein the common groove (24) is the groove that houses the needle race (12).

14. The assembly according to claim 12, wherein the groove (24) that houses the needle race (12) has a bottom (32) which forms a raceway for the needle race (12) and forms a thrust surface for the split washer (16), and wherein the bottom (32) has a substantially straight profile with a tolerance of within approximately 0.5 mm.

15. The assembly according to claim 3, wherein the peripheral supports (18, 19) are angularly distributed substantially uniformly.

* * * * *